US012583028B2

(12) United States Patent
Jeon et al.

(10) Patent No.: US 12,583,028 B2
(45) Date of Patent: Mar. 24, 2026

(54) FIBER STRUCTURE WITH IMPROVED FLEXIBILITY AND RESPONSIVENESS AND MANUFACTURING METHOD THEREOF

(71) Applicants: HYUNDAI MOTOR COMPANY, Seoul (KR); KIA CORPORATION, Seoul (KR); INDUSTRIAL COOPERATION FOUNDATION JEONBUK NATIONAL UNIVERSITY, Jeonju-si (KR)

(72) Inventors: Hong Chan Jeon, Seoul (KR); Sung June Park, Jeonju-si (KR); Sang Min Lee, Jeonju-si (KR)

(73) Assignees: HYUNDAI MOTOR COMPANY, Seoul (KR); KIA CORPORATION, Seoul (KR); INDUSTRIAL COOPERATION FOUNDATION JEONBUK NATIONAL UNIVERSITY, Jeonju-si (KR)

( * ) Notice: Subject to any disclaimer, the term of this patent is extended or adjusted under 35 U.S.C. 154(b) by 454 days.

(21) Appl. No.: 18/082,294

(22) Filed: Dec. 15, 2022

(65) Prior Publication Data

US 2023/0415220 A1 Dec. 28, 2023

(30) Foreign Application Priority Data

Jun. 23, 2022 (KR) ......................... 10-2022-0076552

(51) Int. Cl.
*B21F 1/00* (2006.01)
*G01V 3/08* (2006.01)
(52) U.S. Cl.
CPC ................ *B21F 1/00* (2013.01); *G01V 3/088* (2013.01)

(58) Field of Classification Search
CPC .. B21F 1/00; G01V 3/088; G01D 5/24; D01F 8/14; D01D 5/24; D01D 5/30; G01L 1/14; D10B 2331/04; D10B 2401/061
(Continued)

(56) References Cited

U.S. PATENT DOCUMENTS 11,199,931 B2 12/2021 Cobanoglu et al.
2003/0232194 A1* 12/2003 Koyanagi ................. D01F 8/14
428/392
(Continued)

FOREIGN PATENT DOCUMENTS

EP 0603853 * 12/1993 .............. D04H 1/54
JP 2011-102457 A 5/2011
(Continued)

OTHER PUBLICATIONS

Cooper, C.B., et al., "Stretchable Capacitive Sensors of Torsion, Strain, and Touch Using Double Helix Liquid Metal Fibers," Adv. Funct. Mater. 2017, 27, 1605630.
(Continued)

*Primary Examiner* — Raul J Rios Russo
(74) *Attorney, Agent, or Firm* — MCDONNELL BOEHNEN HULBERT & BERGHOFF LLP

(57) ABSTRACT

A composite fiber structure with improved flexibility and responsiveness, and a method for manufacturing the same, and more particularly, through an interdigitated structure of composite fibers into which a liquid metal is injected, it is possible to have flexibility and fast responsiveness at the same time.

18 Claims, 11 Drawing Sheets

(58) Field of Classification Search
USPC .......................................................... 324/663
See application file for complete search history.

(56) References Cited

U.S. PATENT DOCUMENTS

| | | | |
|---|---|---|---|
| 2011/0159235 A1* | 6/2011 | Wang | D04H 1/5416 |
| | | | 156/61 |
| 2017/0157865 A1* | 6/2017 | Hattar | B29C 70/465 |
| 2017/0190851 A1* | 7/2017 | Garhart | C08K 7/22 |
| 2020/0115848 A1* | 4/2020 | Milton | D06M 23/14 |
| 2020/0208305 A1* | 7/2020 | Su | D01F 1/10 |
| 2020/0208307 A1* | 7/2020 | Su | D02G 3/36 |
| 2021/0293520 A1* | 9/2021 | Kon | G01B 7/18 |
| 2022/0032353 A1* | 2/2022 | Kang | B21C 37/047 |

FOREIGN PATENT DOCUMENTS

| | | | |
|---|---|---|---|
| JP | 2020-009418 A | 1/2020 | |
| KR | 10-2243899 B1 | 4/2021 | |

OTHER PUBLICATIONS

Al Rumon, A., et al., "Fabrication of interdigitated capacitor on fabric as tactile sensor," Sensors International 2 (2021) 100086.
Nair, Nitheesh M., et al., "Direct writing of silver nanowire-based ink for flexible transparent capacitive touch pad," Flex. Print. Electron. 4 (2019) 045001.
Kang, M., et al., "Graphene-Based Three-Dimensional Capacitive Touch Sensor for Wearable Electronics," ACS Nano 2017, 11, 7950-7957.

* cited by examiner

FIG. 9

FIBER STRUCTURE WITH IMPROVED FLEXIBILITY AND RESPONSIVENESS AND MANUFACTURING METHOD THEREOF

CROSS REFERENCE TO RELATED APPLICATIONS

This application claims under 35 U.S.C. § 119(a) the benefit of priority to Korean Patent Application No. 10-2022-0076552 filed on Jun. 23, 2022, the entire contents of which are incorporated herein by reference.

BACKGROUND

(a) Technical Field

The present disclosure relates to a composite fiber structure and a method for manufacturing the same.

(b) Background Art

These days, electronic devices, home appliances, and industrial devices are advancing rapidly, and there is the growing trend of preferring high quality, miniaturized, and lightweight electronic components. Additionally, with the increasing diversification of electronic components, multi-functionalization of components is required. Besides, the development of information and communication devices, automobile industry, and energy industry leads researches to be conducted actively on a capacitive sensor having a high power density and high-efficiency charge/discharge rate characteristics.

Meanwhile, the conventional capacitive sensor has a disadvantage in that it is not flexible because it is made of a rigid substrate or metal material. Therefore, researches on the development of a capacitive sensor material capable of maintaining conductivity while, at the same time, having flexibility are being actively conducted.

SUMMARY

The present disclosure addresses the aforementioned drawbacks, and an objective of the present disclosure is to provide a composite fiber structure that has the flexibility of the fiber and maintains the conductivity of the liquid metal at the same time.

The objectives of the present disclosure are not limited to the one mentioned above. The objective of the present disclosure will become more apparent by the following description, and will be realized by means and combinations thereof recited in the claims.

A composite fiber structure according to the present disclosure includes a composite fiber structure having at least one or more composite fibers including a hollow fiber, a liquid metal injected into an inner space of the hollow fiber, and a metal wire inserted into the liquid metal, wherein the composite fibers may be arranged in an interdigitated structure.

The interdigitated structure may be a structure in which the composite fibers are arranged such that their axes are parallel or nearly parallel to each other.

The hollow fiber may include a thermoplastic polyester elastomer (TPEE).

The hollow fiber has an average diameter of 0.2 mm to 1 mm, and the inner space of the hollow fiber may have an average diameter of 0.1 mm to 0.9 mm.

The hollow fiber may have a Young's modulus of 1 MPa(1 mm/min) to 200 MPa(1 mm/min).

The hollow fiber may have a relative permittivity of 1 to 10 measured at a frequency of 100 Hz.

The liquid metal may have a specific resistance of $3.0 \times 10^{-5}$ Ω·cm to $2.5 \times 10^{-5}$ Ω·cm.

The composite fiber may have a Young's modulus of 1 MPa(1 mm/min) to 150 MPa(1 mm/min).

When the composite fiber is elongated to 400%, it may have the average outer diameter of 400 μm to 500 μm, and the average inner diameter of 200 μm to 300 μm.

The capacitive sensor according to the present disclosure may include the composite fiber structure, and alternately applies, during its operation, voltages having different polarities to the composite fibers of the composite fiber structure.

A method for manufacturing a composite fiber structure according to the present disclosure includes preparing a hollow fiber with an inner space therein, injecting a liquid metal into the inner space of the hollow fiber, obtaining a composite fiber by inserting a metal wire so that one end thereof is inserted into the liquid metal and the other end thereof is exposed to the outside, and obtaining the composite fiber structure by arranging at least one or more composite fibers in an interdigitated structure.

The method may further include elongating the composite fiber after the obtaining of the composite fiber.

In the step of elongating, the composite fiber may be elongated to between 100% and 500%.

The average diameter of the composite fiber may be reduced to between 30% and 75% according to elongation.

According to the present disclosure, it is possible to provide a capacitive sensor in which a change in capacitance occurs in response to contact with a human body.

According to the present disclosure, it is possible to provide a capacitive sensor in which the change in capacitance occurs in a different manner according to the number of the composite fibers.

According to the present disclosure, it is possible to provide a composite fiber structure with excellent flexibility and responsiveness.

The effects of the present disclosure are not limited to the aforementioned effects. It should be understood that the effects of the present disclosure include all effects that can be inferred from the following description.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein:

FIGS. 9 and 10 represent results of measuring the capacitance upon the contact with the human body while changing the number of composite fibers.

Figure 1:
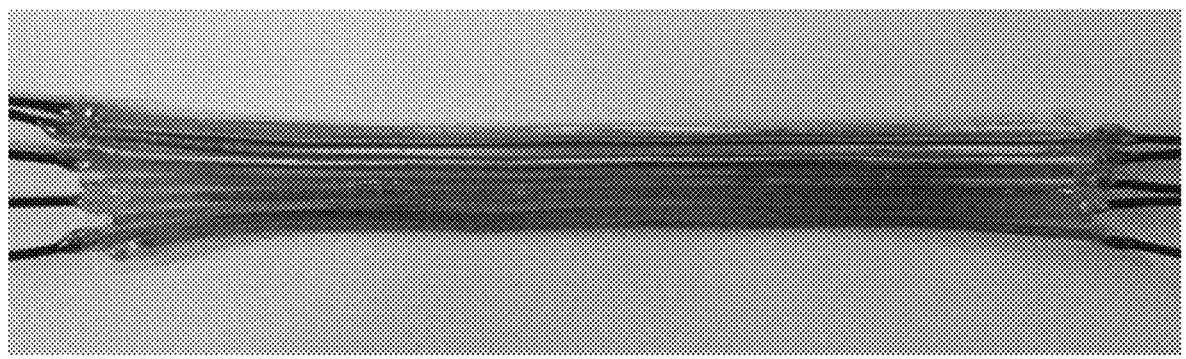
FIG. 1 shows a front view of a composite fiber structure according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The aforementioned objectives, other objectives, features and advantages of the present disclosure will be easily understood through the following preferred embodiments in conjunction with the accompanying drawings. However, the present disclosure is not limited to the embodiments described herein, but may be embodied in other forms. Rather, the embodiments introduced herein are provided so that the disclosed contents may be thorough and complete, and the technical idea of the present disclosure may be sufficiently conveyed to those skilled in the art.

At the time of describing respective drawings, like reference numerals have been used for like components. In the accompanying drawings, the dimensions of the structures are enlarged from reality for clarity of the present disclosure. Terms, such as "first" and "second," can be used to describe various components, but the components should not be limited by the terms. Said terms are used in order only to distinguish one component from another component. For example, the first component can be designated as the second component without departing from the scope of the present disclosure, and, similarly, the second component can also be designated as the first component. Singular expressions may include the meaning of plural expressions unless the context clearly indicates otherwise.

The terms such as "include (or comprise)", "have (or be provided with)", and the like are intended to indicate that features, numbers, steps, operations, components, parts, or combinations thereof written in the following description exist, and thus should not be understood as that the possibility of existence or addition of one or more different features, numbers, steps, operations, components, parts, or combinations thereof is excluded in advance. Also, when it is stated that a portion of a layer, film, region, plate, or the like is "on" another portion, it includes not only the case where it is "directly on" another portion, but also the case where other portion is interposed therebetween. Conversely, when it is stated that a portion of a layer, film, region, plate, or the like is "under" another portion, it includes not only the case where it is "directly under" another portion, but also the case where other portion is interposed therebetween.

Unless otherwise specified, all numbers, values and/or expressions used herein to express quantities of ingredients, reaction conditions, polymer compositions and compounds are to be understood as being modified in all instances by the term "about", since, among others, these numbers are essentially approximations which reflect the varying uncertainties of the measurements that take place in obtaining these values. Also, where numerical ranges are disclosed in this description, such ranges are continuous and include all values between the minimum and the maximum (inclusive) of the ranges, unless otherwise indicated. Furthermore, when such ranges refer to integers, all integers between the minimum and the maximum (inclusive) are included, unless otherwise indicated.

Composite Fiber Structure

FIG. 1 shows a front view of a composite fiber structure according to the present disclosure. Referring to FIG. 1, the composite fiber structure according to the present disclosure may include a composite fiber which is provided with a hollow fiber, a liquid metal injected into the inner space of the hollow fiber, and a metal wire inserted into the liquid metal.

Unlike the existing capacitive sensor made of a hard substrate or metal material, the present disclosure relates to a capacitive sensor whose capacitance changes in response to contact with a human body by way of an interdigitated structure of composite fibers made of hollow fibers and liquid metal. Since the composite fiber is manufactured by injecting the liquid metal into the hollow fiber, it is possible to maintain the flexibility of the fiber and the conductivity of the liquid metal at the same time, enabling the rapid responsiveness.

The hollow fiber may have an inner space formed therein along the fiber length direction.

The hollow fiber includes thermoplastic polyester elastomer (TPEE), and preferably at least any one of poly(styrene-b-ethylene-co-butylene-b-styrene) triblock copolymers (SEBS) and silicone.

The hollow fiber of the present disclosure employs a thermoplastic polyester-based elastomer with a high elongation in response to external tension. This is because, if a material having a high elongation as high as that of the thermoplastic polyester-based elastomer is not used as the hollow fiber, it may be difficult to adjust the diameter of the metal wire by stretching the hollow fiber.

The hollow fiber may have an average diameter of 0.2 mm to 1 mm. In this regard, if the average diameter of the hollow fibers is greater than 1 mm, a problem of leakage after injection of liquid metal would occur.

The inner space of the hollow fiber may have an average diameter of 0.1 mm to 0.9 mm.

The hollow fiber may have a Young's modulus of 100 MPa to 200 MPa.

In the present disclosure, the elongation limit of the hollow fiber may vary depending on the Young's modulus of the hollow fiber thereof, and the diameter and length of the manufactured metal wire may also vary.

Herein, the elongation limit refers to the maximum elongation at which the hollow fiber can be elongated together with the liquid metal contained in the inner space. That is, when the elongation limit is exceeded, the hollow fiber can be further elongated, but the liquid metal is no longer elongated.

The hollow fiber may have a Young's modulus of 1 MPa to 200 MPa.

The hollow fiber may have a relative permittivity of 1 to 10 measured at a frequency of 100 Hz.

The liquid metal may be gallium, or an alloy containing gallium. For example, it may be a eutectic gallium-indium alloy.

The liquid metal may have a specific resistance of $3.0 \times 10^{-5}$ $\Omega \cdot$cm to $2.5 \times 10^{-5}$ $\Omega \cdot$cm.

Figure 2:
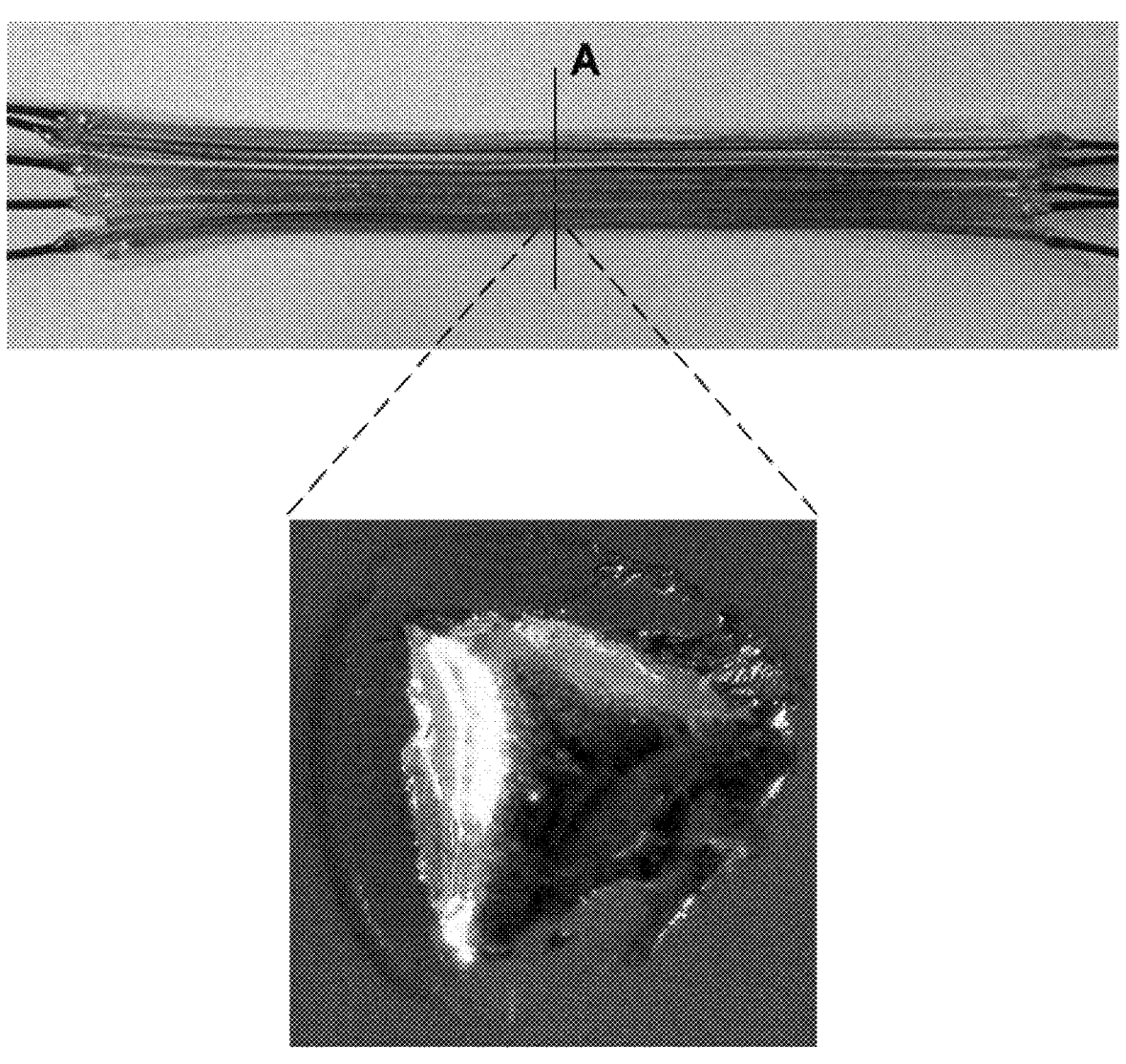
FIG. 2 shows a cross-sectional view taken along line A of FIG. 1.

FIG. 2 shows a cross-sectional view taken along line A of FIG. 1. Referring to FIG. 2, the liquid metal fully fills the inner space of the hollow fiber to conform its shape to that of the inner space.

The metal wire may include at least one kind of aluminum (Al), zinc (Zn), tin (Sn), and copper (Cu), and preferably may be copper (Cu).

The composite fiber may have a Young's modulus of 11 MPa to 150 MPa.

When the composite fiber is elongated to 400%, it may have the average outer diameter of 400 μm to 500 and the average inner diameter of 200 μm to 300 μm.

The composite fiber structure according to the present disclosure may include at least one or more composite fibers, and the composite fibers may be arranged in an interdigitated structure.

FIG. 1 shows a front view of a composite fiber structure according to the present disclosure. Referring to FIG. 1 above, as used herein, the interdigitated structure may refer to a structure in which the composite fibers are arranged such that their axes are parallel or nearly parallel to each other. When the composite fibers are arranged in an interdigitated structure as in the present disclosure, there is an advantage in that the power storage effect increases according to the number of fibers, which may be advantageous for use in a capacitive sensor.

Capacitive Sensor

The capacitive sensor according to the present disclosure may include the composite fiber structure, and alternately applies, during its operation, voltages having different polarities to the composite fibers of the composite fiber structure. Specifically, it alternately applies the voltages in such a manner that the polarities of the voltages are opposite to each other between adjacent composite fibers. The above features may lead to an advantage of enabling the departure from the parallel plate type sensor, which could not be done with a fiber type, therefore resulting in a better capacitive sensor.

In the case of the aforementioned capacitive sensor, the change in capacitance may differ depending on the number of the composite fibers. It can be expected that the capacitive sensor of the present disclosure achieves the same effect as a two-dimensional material through the parallel connection of the fibers without a process of interdigitating the fibers. Additionally, its performance will increase according to the number of fibers connected to each other.

The aforementioned capacitive sensor can detect a decrease in capacitance caused when a human body, which is a type of conductor, contacts it.

In addition, it can maintain responsiveness to external stimuli even in the state of being deformed, and be mass-produced in the future due to the advantage of the simple process, so it can be utilized for wearable electronic devices, automotive electronic parts and the like. Hereinafter, a method for manufacturing the composite fiber structure will be described in detail.

Method for Manufacturing a Composite Fiber Structure

Figure 3:
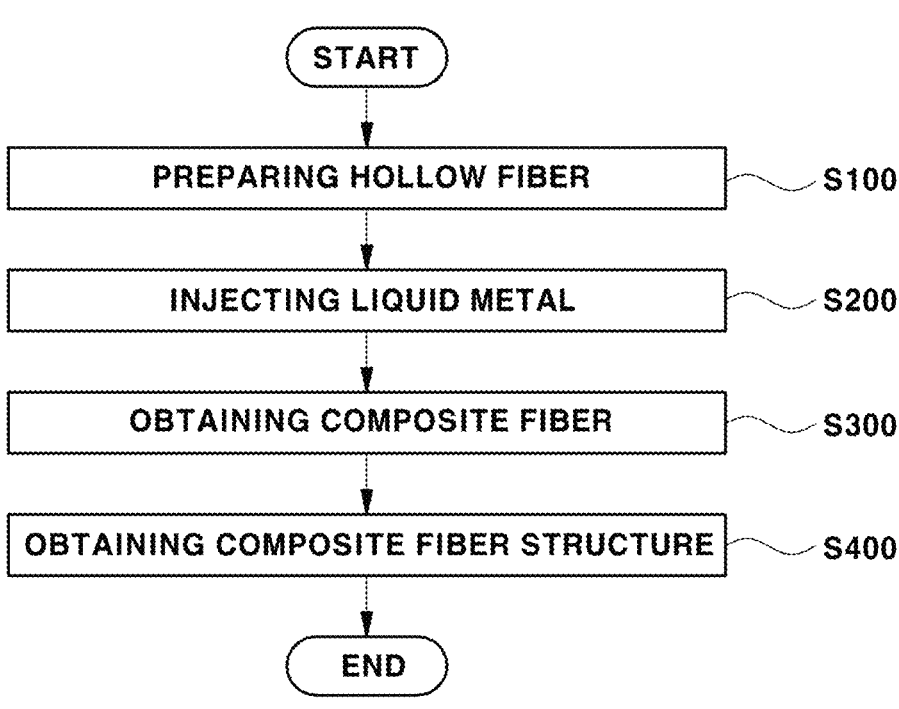
FIG. 3 schematically shows a flow chart for a method for manufacturing a composite fiber structure of the present disclosure.
Figure 4:
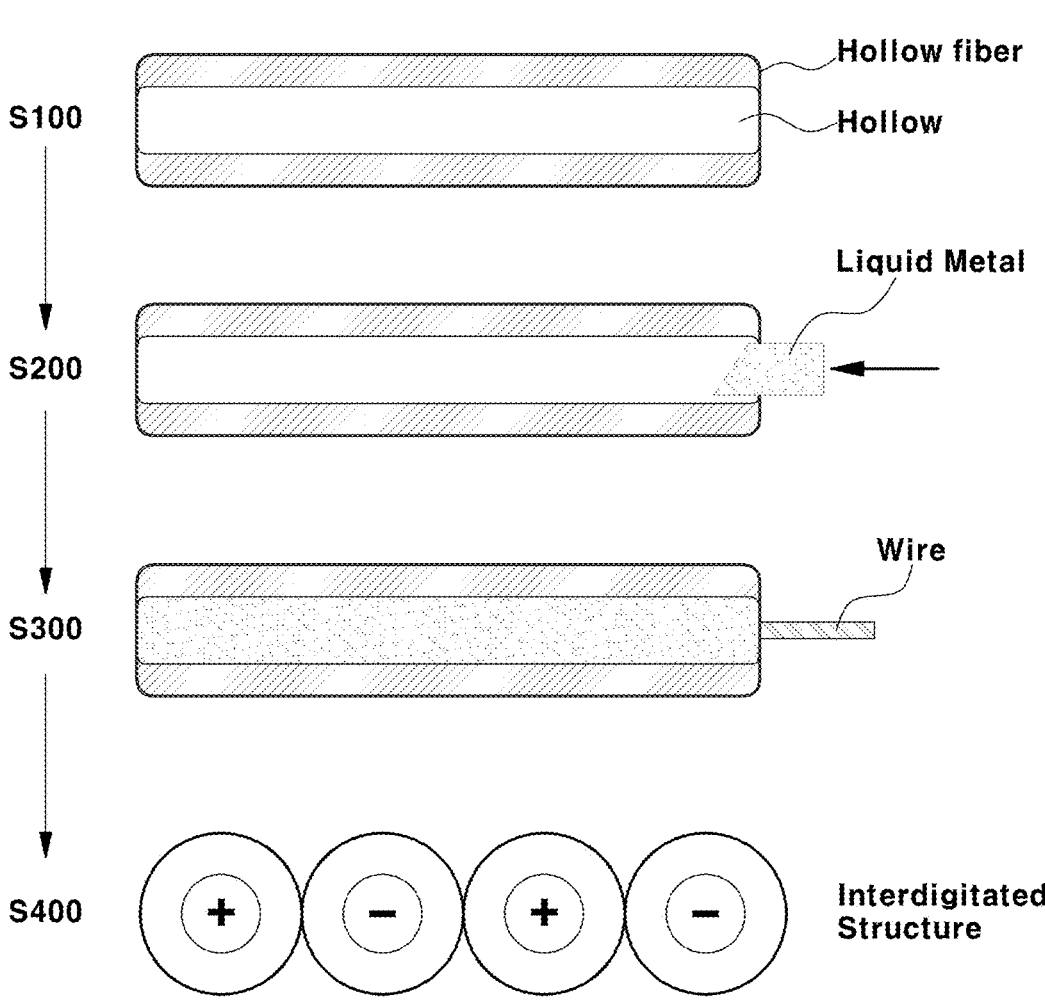
FIG. 4 is a process diagram schematically representing a method for manufacturing a composite fiber structure of the present disclosure.

FIG. 3 schematically shows a flow chart for a method for manufacturing a composite fiber structure of the present disclosure. FIG. 4 is a process diagram schematically representing a method for manufacturing a composite fiber structure of the present disclosure.

Referring to FIGS. 3 and 4, the method for manufacturing a composite fiber structure according to the present disclosure includes preparing a hollow fiber with an inner space therein at S100, injecting a liquid metal into the inner space of the hollow fiber at S200, obtaining a composite fiber by inserting a metal wire so that one end thereof is inserted into the liquid metal and the other end thereof is exposed to the outside at S300, and obtaining the composite fiber structure by arranging at least one or more composite fibers in an interdigitated structure at S400.

First, in step S100, a hollow fiber including an inner space may be prepared. Referring to FIG. 4 above, it can be seen that the inner space is formed in the hollow fiber along the fiber length direction. The hollow fiber can be elongated up to 1400%. The hollow fiber is configured similarly as described above with regard to the composite fiber structure.

Next, in step S200, a liquid metal may be injected into the inner space of the hollow fiber. Although a method of injecting the liquid metal is not limited to a certain one, but, in the present disclosure, it was injected through a syringe. It can be seen that the liquid metal is fully filled in the inner space of the hollow fiber, and the solution is filled in conformity of the shape of the inner space. There is no significant change in the breaking point in spite of the liquid metal filling. The liquid metal is configured similarly as described above with regard to the composite fiber structure.

Subsequently, in step S300, a composite fiber may be obtained by inserting a metal wire. One end of the metal wire is inserted into the liquid metal, and the other end thereof may be exposed to the outside, and be connected to a power source to measure capacitance.

At this time, said step S300 may further include elongating the composite fiber further more. In the step of elongating, the composite fiber may be elongated to between 100% and 500%.

The average diameter of the composite fiber may be reduced to between 30% and 75% according to elongation. When the composite fiber is elongated to 400%, it may have the average outer diameter of 400 μm to 500 μm and the average inner diameter of 200 μm to 300 μm.

Since the composite fiber is manufactured and then elongated, it is possible to manufacture a thinner composite fiber. The metal wire and the composite fiber are configured similarly as described above with regard to the composite fiber structure.

Finally, in step S400, a composite fiber structure may be obtained by arranging the composite fibers in an interdigitated structure. The composite fiber structure is configured similarly as described above.

Hereinafter, the present disclosure will be described in detail with reference to the following Examples and Comparative Examples. However, the technical idea of the present disclosure is not limited or restricted thereto.

Example 1

A composite fiber was manufactured by injecting a liquid metal, eutectic gallium-indium alloy (EGaIn), into the inner space of a thermoplastic polyester elastomer (TPEE) with an outer diameter of 800 μm, an inner diameter of 450 μm, a Young's modulus of 1.83 MPa (1 mm/min) and a diameter of 450 μm. An electric signal was measured by inserting a tin-plated annealed copper wire as a metal wire.

Comparative Example 1

Except for the processes of injecting the liquid metal into the hollow fiber and inserting the metal wire, it was manufactured in the same manner as in Example 1.

Experimental Example 1: Evaluation of Physical Properties According to the Presence or Absence of Liquid Metal in the Hollow Fiber After the composite fibers of Example 1 and Comparative Example 1 were respectively manufactured, experiments were conducted on them in the non-elongated state to evaluate the physical properties through a tension tester. The results are shown in FIG. 5.

Figure 5:
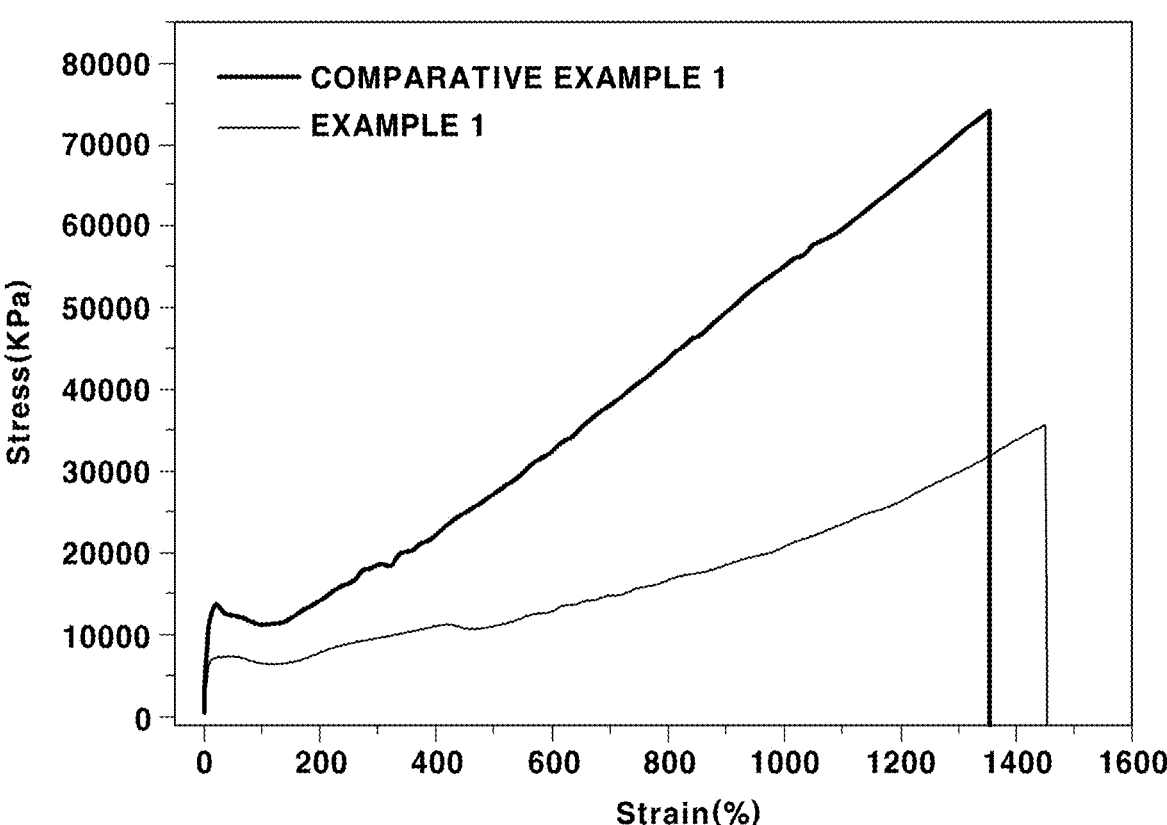
FIG. 5 represents results of evaluating the physical properties of Examples and Comparative Examples of the present disclosure.

FIG. 5 represents results of evaluating the physical properties of Examples and Comparative Examples of the present disclosure. Referring to FIG. 5, it can be seen that the strain of Example 1 is 1450%, while the strain of Comparative Example 1 is 1365%. Additionally, it can be seen that the Young's modulus of Example 1 is 98.6 MPa, while the Young's modulus of Comparative Example 1 is 183 MPa.

That is, through the above results, it can be confirmed that, although the Young's modulus is decreased in Example in which the liquid metal was injected as compared to Comparative Example, the degree of flexibility is still maintained above a certain level, and thus there is no abrupt change in physical properties due to the injection of the liquid metal.

Experimental Example 2: Changes in the Outer and Inner Diameters of the Composite Fiber According to Elongation An experiment was conducted for measuring the outer and inner diameters according to the elongation of the composite fiber manufactured in Example 1. The results are shown in FIG. 6.

Figure 6:
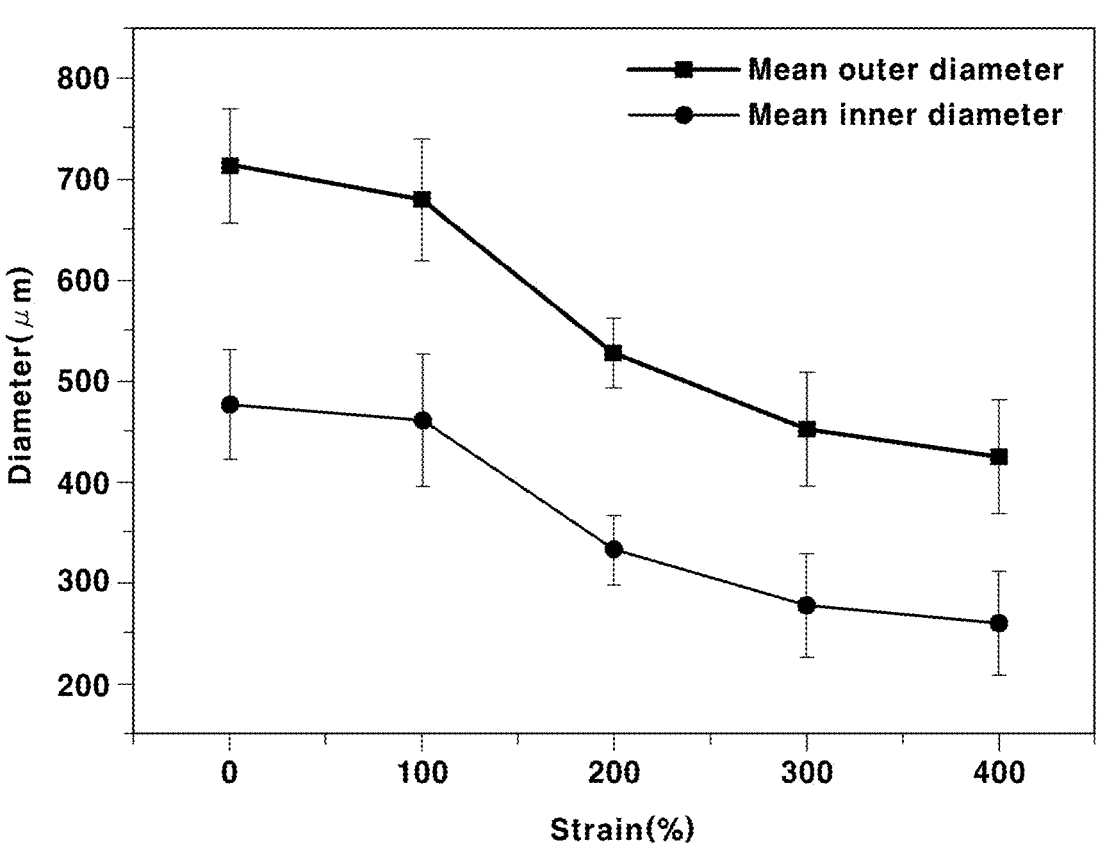
FIG. 6 represents results of measuring the outer and inner diameters according to the elongation of Example of the present disclosure.

FIG. 6 represents results of measuring the outer and inner diameters according to the elongation of Example of the present disclosure. Referring to FIG. 6, it can be seen that the outer and inner diameters of the composite fiber decrease as the strain increases. In addition, it can be confirmed that, when being elongated to 400%, the average outer diameter is 425 μm and the average inner diameter is 258 μm. Since the composite fiber of the present disclosure is elongated after manufacturing the composite fiber by injecting liquid metal into the non-elongated hollow fiber, it is possible to manufacture a fiber of a very small diameter.

Experimental Example 3: Resistance Evaluation of the Composite Fiber According to Elongation An experiment was conducted for evaluating the resistance of the composite fiber manufactured in Example 1. The results are shown in FIG. 7.

Figure 7:
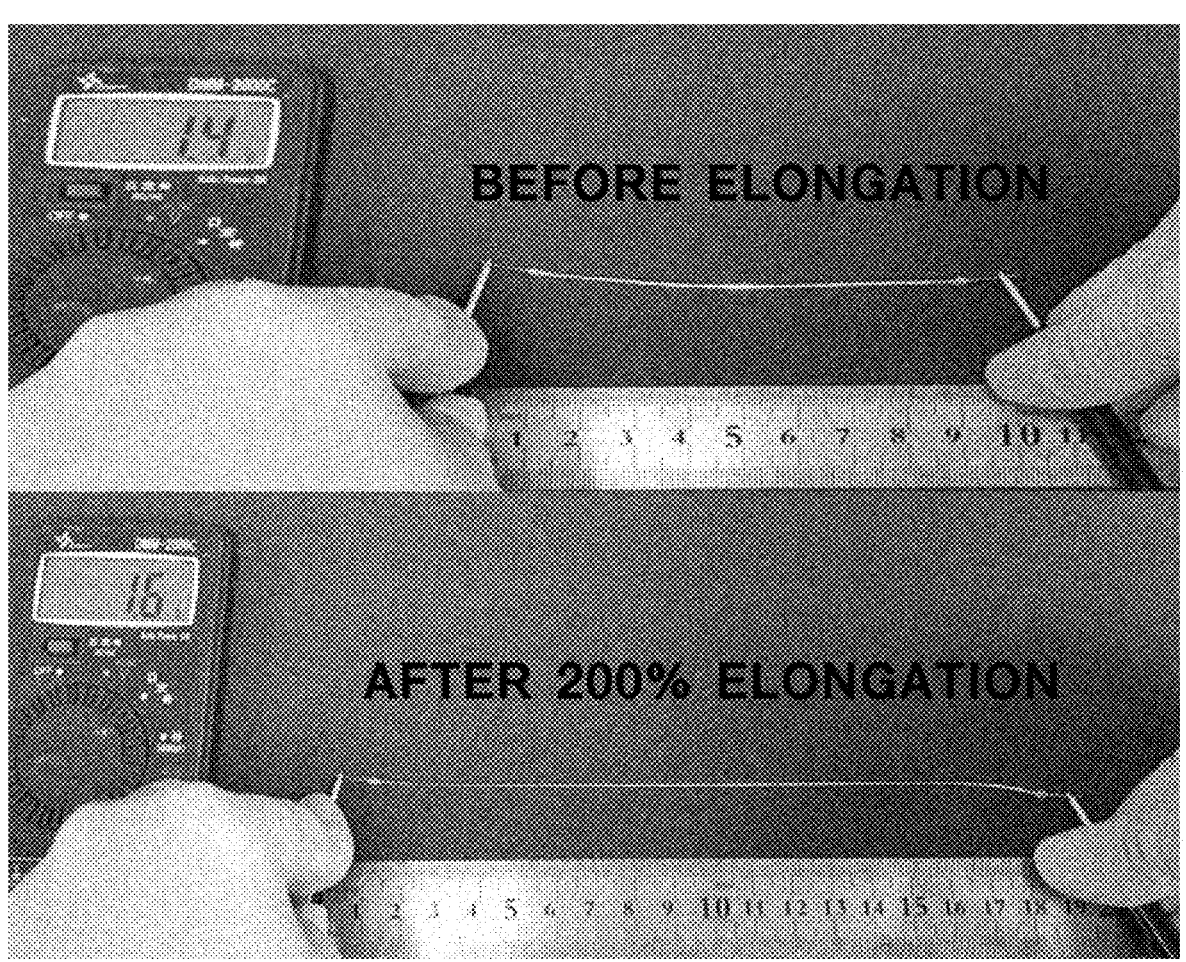
FIG. 7 represents results of measuring the resistance according to the elongation of Example of the present disclosure.

FIG. 7 represents results of measuring the resistance according to the elongation of Example of the present disclosure. Referring to FIG. 7, it can be seen that it is possible to fix the length of the composite fiber even after the elongation thereof due to its characteristics. This is an effect due to the thermoplastic properties of that composite fiber, and the fiber can be maintained in a deformed state even without solidifying the liquid metal inside the composite fiber. As in the above experiment, it can be confirmed that, even after 200% elongation, it is possible for the composite fiber to maintain a certain level of resistance due to the fluidity of the liquid metal.

Experimental Example 4: Change in Capacitance According to the Number of Composite Fibers A capacitive sensor was manufactured using the composite fiber manufactured in Example 1. (In the case of Experimental Example 4, not elongated)

After arranging the composite fibers manufactured in Example 1 into an interdigitated structure, a change in capacitance upon contact with the human body was measured through an external measuring device. That structure acts as a contact sensor.

An experiment was conducted for finding the change in capacitance through adjusting the number of composite fibers of the capacitive sensor. The results are shown in FIGS. 8A and 8B.

Figure 8A:
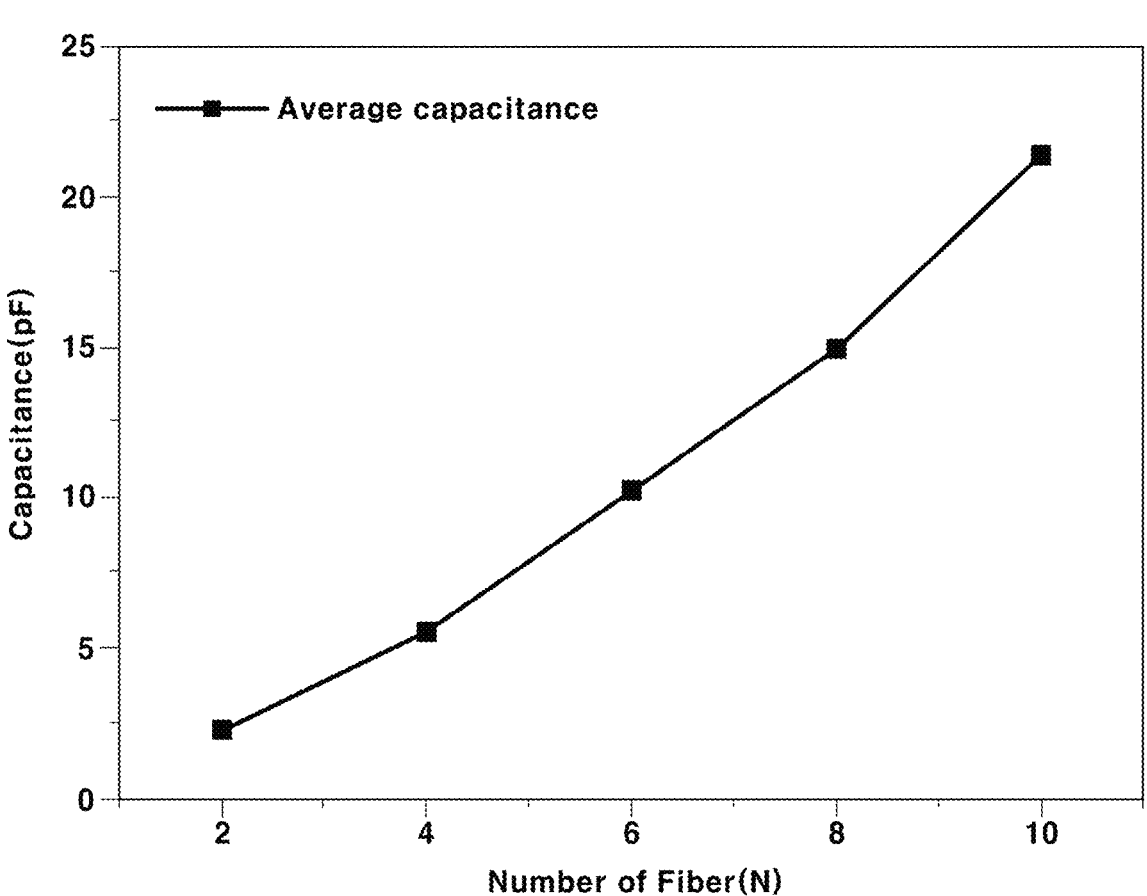
FIGS. 8A and 8B represent results of measuring the capacitance by the number of composite fibers.
Figure 8B:
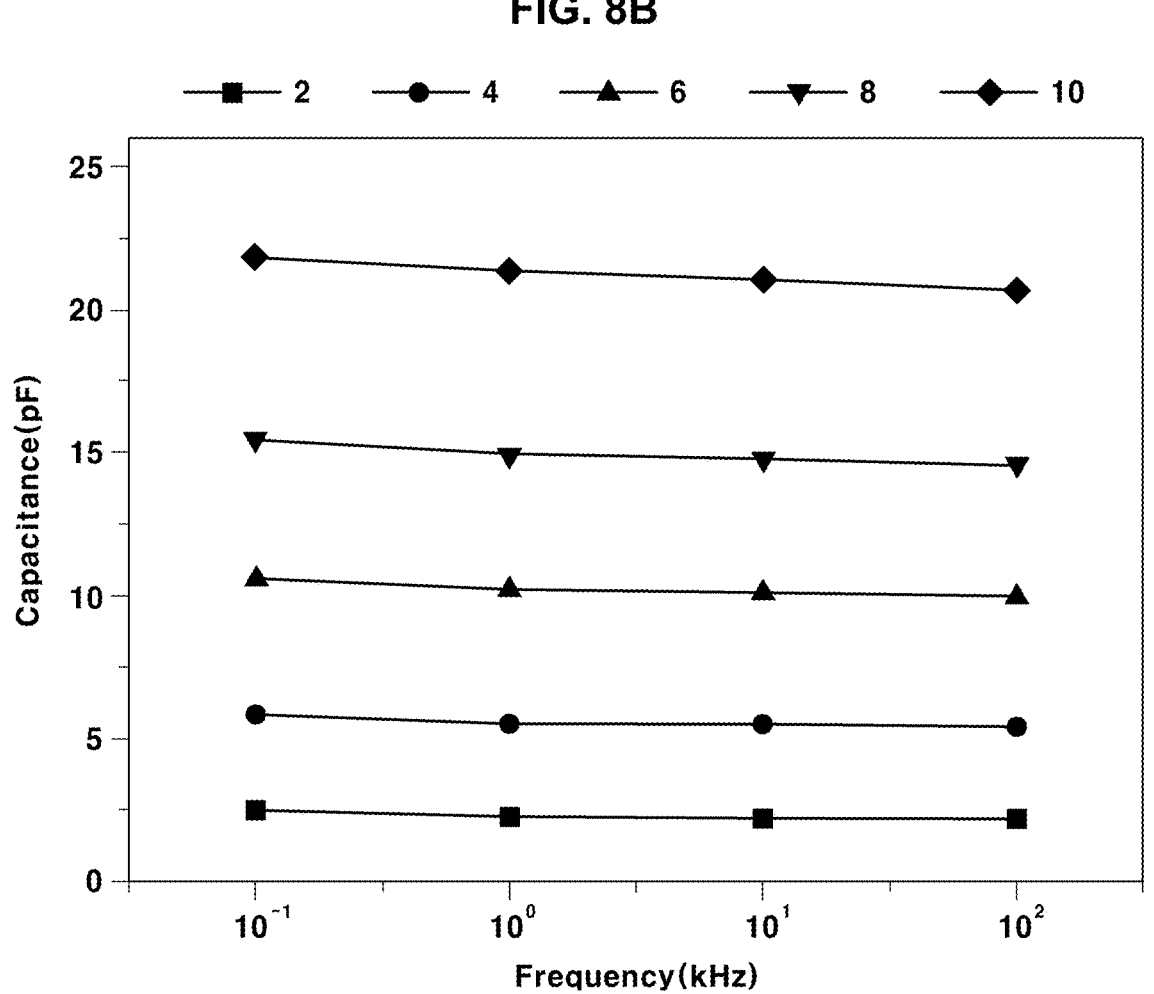

FIGS. 8A and 8B represent results of measuring the capacitance by the number of composite fibers. Referring to FIG. 8A, it can be seen that the capacitance value increases linearly as the number of composite fibers increases. Additionally, referring to FIG. 8B, as a result of confirming the stability at various frequencies, it can be confirmed that an abrupt decrease in the capacitance value does not appear.

Therefore, it enables a user to set the capacitance value by adjusting the number of fibers, and it can be seen that the fundamental performance does not decrease at various frequencies.

Experimental Example 5: Change in Capacitance Upon the Contact with the Human Body According to the Number of Composite Fibers (Elongation X)

An experiment was conducted for finding the change in capacitance according to the number of composite fibers when the human body contacts the capacitive sensor. The experiment was conducted using the capacitive sensor manufactured in Experimental Example 4. The results are shown in FIG. 9.

Figure 9:
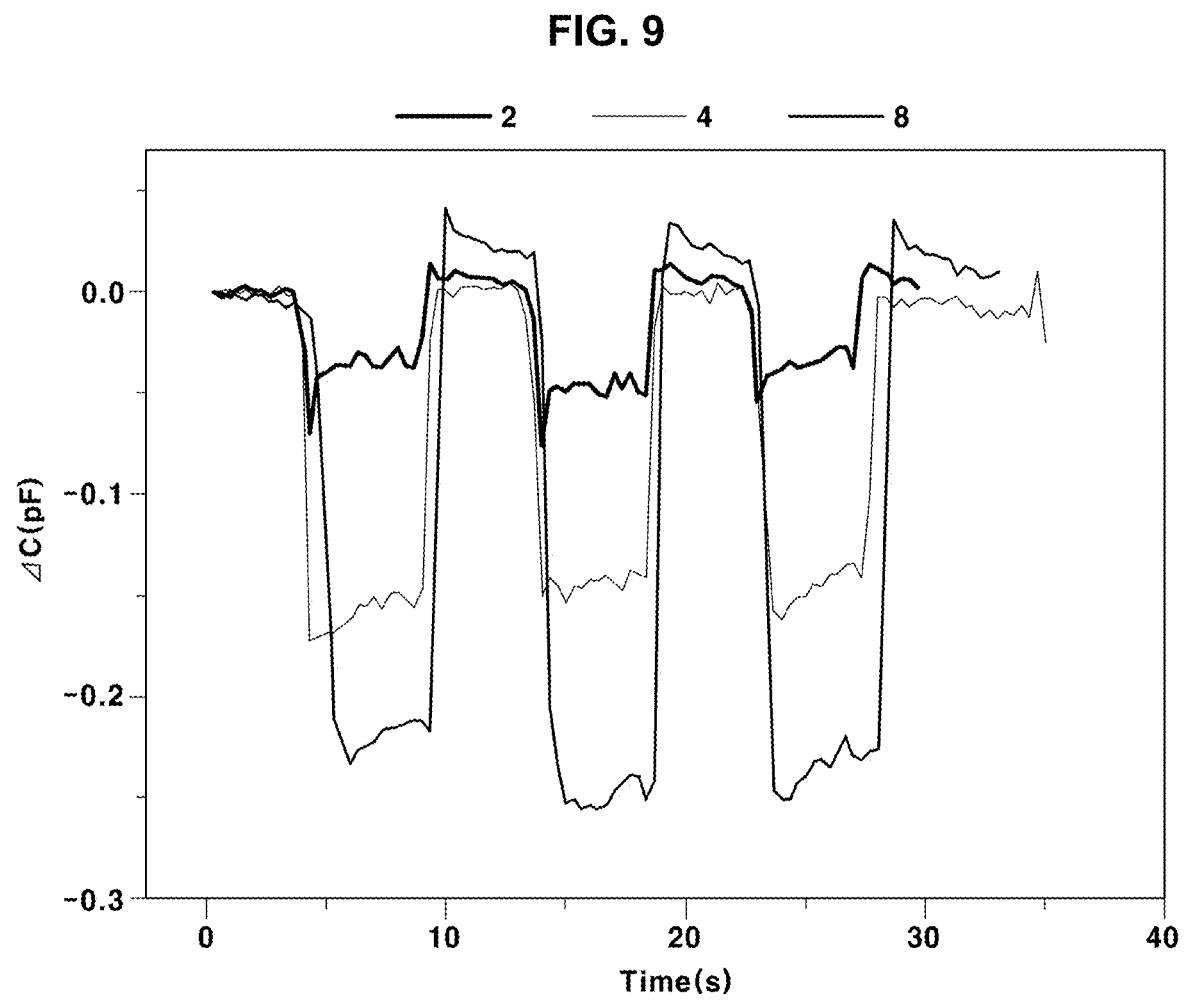

FIG. 9 represents results of measuring the capacitance upon the contact with the human body while changing the number of composite fibers. Referring to FIG. 9, it can be seen that a decrease in capacitance occurs when the human body, which is a type of conductor, contacts the capacitive sensor. Therefore, it can be confirmed that the capacitance change value can be adjusted by adjusting the number of composite fibers.

Experimental Example 6: Change in Capacitance Upon Contact with the Human Body According to the Number of Composite Fibers (Elongation O)

An experiment was conducted for finding the change in capacitance according to the difference in the number of composite fibers when the human body contacts the capacitive sensor manufactured in Experimental Example 4. The capacitive sensor used in Experimental Example 6 is the same as in Experimental Example 5, except that during the manufacturing of the composite fiber structure, the step of elongating the composite fiber is additionally performed after step S300 to elongate the composite fiber to 200%. The results are shown in FIG. 10.

Figure 10:
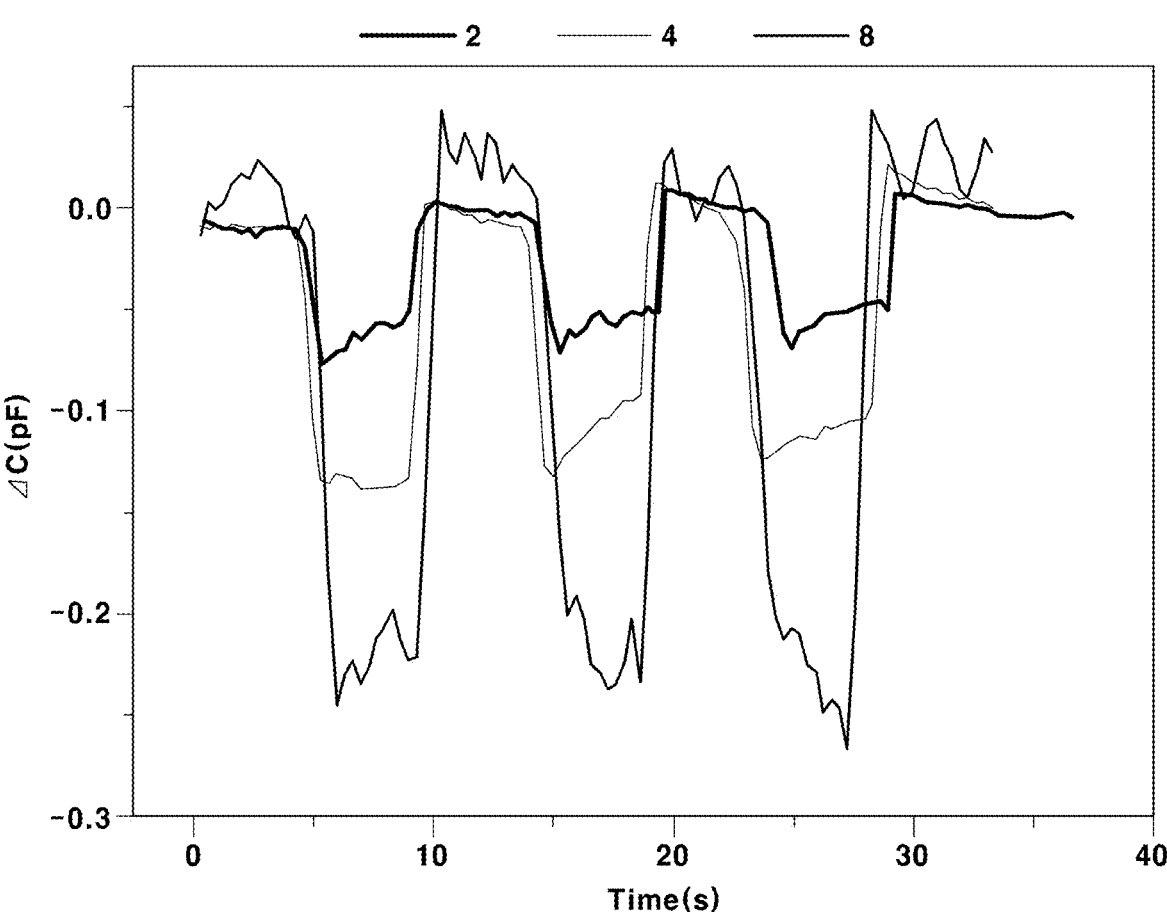

FIG. 10 represents results of measuring the capacitance upon the contact with the human body while changing the number of composite fibers. Referring to FIG. 10, it can be seen that a decrease in capacitance occurs when the human body, which is a type of conductor, contacts the capacitive sensor. In addition, it can be seen that, although the outer and inner diameters of each fiber were reduced to between 30% or more due to 200% elongation, a certain level of performance is nonetheless maintained.

Therefore, it can be confirmed that, even when the composite fiber is elongated, it is possible to maintain a certain level of performance.

Therefore, the composite fiber structure according to the present disclosure can be manufactured by injecting a liquid metal into a hollow fiber with flexibility to manufacture a composite fiber, and arranging the composite fibers in an interdigitated structure, and a capacitive sensor capable of sensing a change in capacitance due to contact with the human body even after the elongation and capable of adjusting the capacitance according to the number of complex fibers, can be implemented by alternately applying the polarities of voltages to the capacitive sensor to which the composite fiber structure is applied.

While the embodiments of the present disclosure have been described above, those of ordinary skill in the art to which the present disclosure pertains will appreciate that the present disclosure may be implemented in other specific forms without changing the technical idea or essential features thereof. Accordingly, it should be understood that the embodiments described above are illustrative in all respects and not restrictive.

The invention claimed is:

1. A composite fiber structure comprising:
   at least two or more composite fibers comprising:
   a hollow fiber;
   a liquid metal injected into an inner space of the hollow fiber; and
   a metal wire inserted into the liquid metal;
   wherein the at least two or more composite fibers are arranged as an interdigitated structure;
   wherein the interdigitated structure comprises the at least two or more composite fibers being arranged with axes parallel or substantially parallel to each other.

2. The composite fiber structure of claim 1, wherein the hollow fiber comprises a thermoplastic polyester elastomer (TPEE).

3. The composite fiber structure of claim 1, wherein the hollow fiber has an average diameter of about 0.2 mm to 1 mm, and
   the inner space of the hollow fiber has an average diameter of about 0.1 mm to 0.9 mm.

4. The composite fiber structure of claim 1, wherein the hollow fiber has a Young's modulus of about 1 MPa to 200 MPa.

5. The composite fiber structure of claim 1, wherein the hollow fiber has a relative permittivity of about 1 to 10 measured at a frequency of 100 Hz.

6. The composite fiber structure of claim 1, wherein the liquid metal has a specific resistance of about 3.0×10–5 Ω·cm to 2.5×10–5 Ω·cm.

7. The composite fiber structure of claim 1, wherein the composite fiber has a Young's modulus of about 1 MPa to 150 MPa.

8. The composite fiber structure of claim 1, wherein when the composite fiber is elongated to 400%, an average outer diameter of the composite fiber is between about 400 μm and 500 μm, and an average inner diameter of the composite fiber is between about 200 μm and 300 μm.

9. A capacitive sensor comprising a composite fiber structure according to claim 1, wherein during operation, the capacitive sensor alternately applies voltages having different polarities to the at least two or more composite fibers of the composite fiber structure.

10. A method for manufacturing a composite fiber structure, the method comprising:
    preparing a hollow fiber with an inner space;
    injecting a liquid metal into the inner space of the hollow fiber;
    obtaining a composite fiber by inserting one end of a metal wire with into the liquid metal, and wherein an other end of the metal wire is exposed to an outside; and
    obtaining the composite fiber structure by arranging at least two or more composite fibers in an interdigitated structure;
    wherein the interdigitated structure comprises the at least two or more composite fibers arranged with axes parallel or substantially parallel to each other.

11. The method of claim 10, further comprising elongating the composite fiber after the obtaining of the composite fiber.

12. The method of claim 11, wherein in the elongating, the composite fiber is elongated to between about 100% and 500%.

13. The method of claim 11, wherein an average diameter of the composite fiber may be reduced to between about 30% to 75% according to the elongation.

14. The method of claim 10, wherein the hollow fiber comprises a thermoplastic polyester elastomer (TPEE).

15. The method of claim 10, wherein the hollow fiber has a diameter of about 0.2 mm to 1 mm, and the inner space of the hollow fiber has a diameter of about 0.1 mm to 0.9 mm.

16. The method of claim 10, wherein the hollow fiber has a Young's modulus of about 1 MPa to 200 MPa, and has a relative permittivity of about 1 to 10 measured at a frequency of 100 Hz.

17. The method of claim 10, wherein the liquid metal has a specific resistance of about 3.0×10–5 Ω·cm to 2.5×10–5 Ω·cm.

18. The method of claim 10, wherein the composite fiber has a Young's modulus of about 1 MPa to 150 MPa.

\* \* \* \* \*